United States Patent [19]
Blonder

[11] Patent Number: 5,559,961
[45] Date of Patent: Sep. 24, 1996

[54] GRAPHICAL PASSWORD

[75] Inventor: Greg E. Blonder, Summit, N.J.

[73] Assignee: Lucent Technologies Inc., Murray Hill, N.J.

[21] Appl. No.: 520,904

[22] Filed: Aug. 30, 1995

Related U.S. Application Data

[63] Continuation of Ser. No. 223,252, Apr. 4, 1994, abandoned.

[51] Int. Cl.$^6$ .................................................. G06F 11/00
[52] U.S. Cl. ............................................... 395/188.01
[58] Field of Search .......................... 395/188.01, 186, 395/187.01; 380/4

[56] References Cited

U.S. PATENT DOCUMENTS

| | | | |
|---|---|---|---|
| 4,972,476 | 11/1990 | Nathans | 380/23 |
| 5,040,142 | 8/1991 | Mori et al. | 364/900 |
| 5,109,354 | 4/1992 | Yamashita et al. | 364/708 |
| 5,133,024 | 7/1992 | Foroessl | 382/41 |
| 5,198,983 | 3/1993 | Blake et al. | 364/468 |
| 5,202,929 | 4/1993 | Lemelson | 382/2 |
| 5,260,690 | 11/1993 | Mann et al. | 340/572 |
| 5,273,434 | 12/1993 | Pcch | 434/224 |
| 5,297,031 | 3/1994 | Gutterman et al. | 364/408 |
| 5,337,402 | 8/1994 | Kitagawa et al. | 395/133 |
| 5,349,644 | 9/1994 | Massey et al. | 395/200 |
| 5,357,601 | 10/1994 | Kagawa | 395/133 |
| 5,359,710 | 10/1994 | Aono et al. | 395/133 |
| 5,363,483 | 11/1994 | Jones et al. | 395/133 |

FOREIGN PATENT DOCUMENTS

| | | |
|---|---|---|
| 77103087 | 2/1988 | Taiwan . |
| 79104405 | 5/1990 | Taiwan .......................... G06F 15/00 |
| 93/11511 | 6/1993 | WIPO .............................. G07C 9/00 |

OTHER PUBLICATIONS

Anonymous, "Graphical Passwords", International Technology Disclosures, vol. 10, No. 1, Jan. 1992 p. 3.
King, "Rebus Passwords" 1991 Computer Security Applications Conference, IEEE pp. 239–243.
IBM Technical Disclosure Bulletin, *Menu Icon with Hidden Geometrical Password*, vol. 32, No. 10B, Mar. 1990 NY, pp. 463–464.

*Primary Examiner*—Robert W. Beausoliel, Jr.
*Assistant Examiner*—Joseph E. Palys
*Attorney, Agent, or Firm*—David Volejnicek

[57] ABSTRACT

A graphical password arrangement displays a predetermined graphical image and requires a user to "touch" predetermined areas of the image in a predetermined sequence, as a means of entering a password. The password is set by allowing the arrangement to display the predetermined areas, or "tap regions", to a user, and requiring the user to position these tap regions in a location and sequence within the graphical image, with which the user desires the password to be set at. These "tap regions" are then removed from the display, leaving the original image by itself. The arrangement then waits for an entry device (user) to select the "tap regions", as described above, for possible access to a protected resource.

10 Claims, 3 Drawing Sheets

GRAPHICAL PASSWORD

This application is a continuation of application Ser. No. 08/223,252, filed on Apr. 4, 1994, now abandoned.

TECHNICAL FIELD

This invention relates generally to processing systems and specifically relates to resource-access control arrangements such as password arrangements.

BACKGROUND OF THE INVENTION

The use of passwords to control access to resources such as computers, databases, telecommunications facilities, etc., is well known and understood. Before being given access to a requested resource, a user is required to enter a valid password as a way of ensuring that the user is authorized to access the resource. Normally, the password is a word or some other sequence of alphanumeric characters. The nodal method of entry is to speak the word into a microphone or to key the sequence of characters in on a terminal or a telephone keyboard.

Conventional alphanumeric passwords suffer from disadvantages, however. Firstly, they are difficult for the users to remember, particularly if they are arbitrary alphanumeric sequences rather than normal words. Secondly, they are relatively easy to compromise, particularly by the use of a computer that is programmed to automatically try all dictionary words or all permutations of some number of alphanumeric characters as passwords in an attempt to gain unauthorized access to a resource.

To overcome these difficulties, recently new security arrangements have been developed that rely on sensing of a user's individual and not readily duplicated characteristics as a means of validating the user's identity. These include voice analyzers, retina scanners, fingerprint image analyzers, and face image analyzers. While quite effective in overcoming the disadvantages associated with conventional alphanumeric passwords, these arrangements have disadvantages of their own. Chief amongst them is their complexity and associated cost, which make their use impractical for most of applications.

SUMMARY OF THE INVENTION

This invention is directed to overcoming these and other problems and disadvantages of the prior art. Generally according to the invention, them is provided a graphical password arrangement, wherein a user seeking access to a resource is presented with a predetemined image on a visual display and is required to point to (e.g. touch) one or more predetermined positions on the displayed image (referred to herein as "tap regions") in a predetermined order as a way of indicating his or her authorization to access the resource.

Specifically according to the invention as claimed, there is provided a graphical password arrangement and/or method. The arrangement comprises means for displaying a predetermined image, means for storing a predetermined number of predetermined positions in the predetermined image as a password, means responsive to a user for determining a user's selections of locations in the displayed image, means for determining whether the determined locations selected by the user correspond to the predetermined positions of the password, and means responsive to a determination of a lack of correspondence between the determined locations and the predetermined positions for denying the user access to a resource that is protected by the password. The method correspondingly comprises the steps of displaying a predetermined image, selecting locations in the displayed image under user control, determining whether the selected locations correspond to a predetermined number of predetermined positions in the predetermined image that are stored as a password, and denying the user access to the resource in response to a determination that correspondence is lacking between the selected locations and the predetermined positions.

The invention possesses numerous advantages over the prior art. Firstly, people generally find images to be easier to recall than alphanumeric sequences, particularly images with personal meaning. Secondly, even a very coarse matrix of tap regions yields great security. For example, in an arrangement that uses a 3 inch-by-5 inch (7.5 cm -by- 12.5 cm) display with one-quarter inch square (6 mm-by- 6 mm) tap regions and that requires the user to touch three tap regions in the correct order, there are 13.6 million possible combinations. In comparison, a four-digit password like a personal identification number (PIN) is one of only 10,000 possible combinations, and a three-letter password is one of only 17,000 possible combinations. Thirdly, in equipment that already includes a touch-sensitive or a graphics display, the graphical password arrangement is substantially no more difficult or expensive to implement than a conventional password arrangement. But even if the cost and complexity of a touch-sensitive or graphics display and associated software is factored in, the graphical password may be simpler and less costly to implement than the new security arrangements that were mentioned above.

These and other advantages and features of the invention will become more apparent from the following description of an illustrative embodiment of the invention taken together with the drawing.

DETAILED DESCRIPTION

Figure 1:
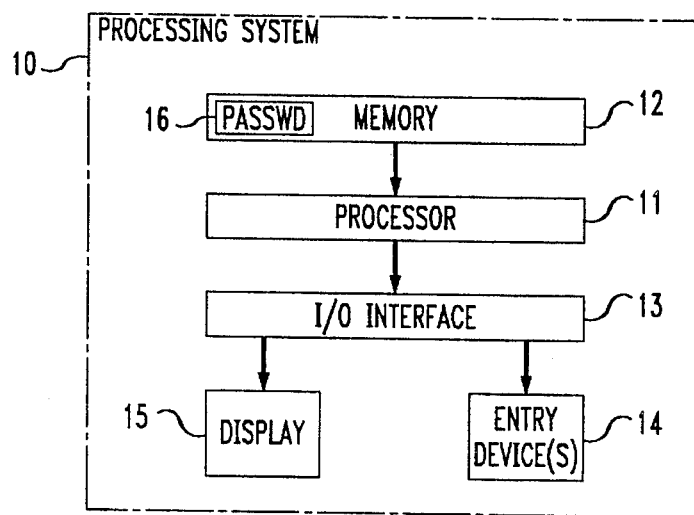
FIG. 1 is a block diagram of an exemplary processing system that includes an illustrative embodiment of the invention.

FIG. 1 shows a general diagram of a processing system 10. Processing system may be any one of a wide variety of systems, such as a personal computer, a telecommunications terminal, a personal digital assistant, an entrance security system, a vehicle ignition control system, etc. Processing system 10 is a program-controlled system. It includes a memory 12 that stores control programs and associated data, and a processor 11 that executes the programs. As is often conventional with such systems, processing system 10 also includes a visual display screen 15 and one or more entry devices 14 (such as a keyboard, a mouse, and/or a light pen or a touch pen) that are coupled to processor 11 by an input and output (I/O) interface 13. Display 15 may be a touch-sensitive display screen, and hence itself may function as one of the entry devices 14. As described so far, processing system 10 and its component elements 11–15 are conventional.

Figure 2:
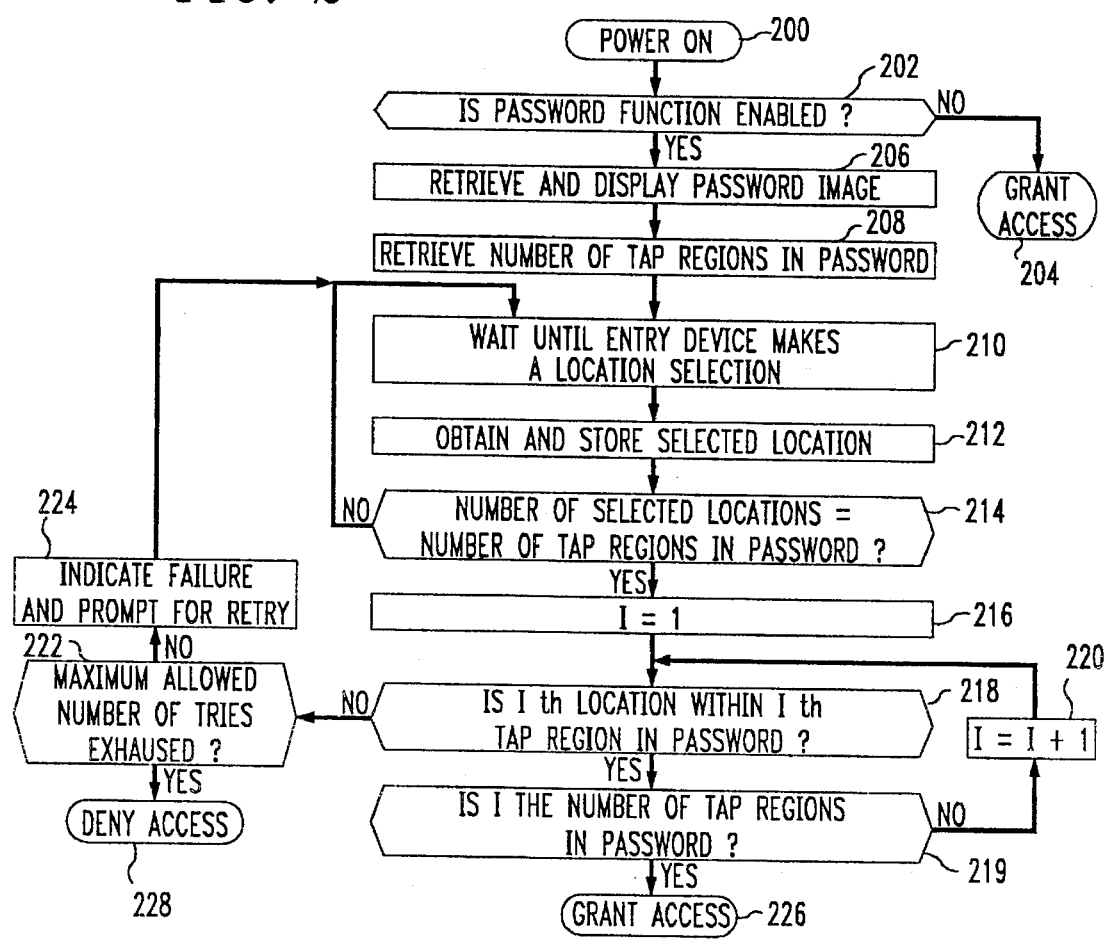
FIG. 2 is a flow diagram of a password function of a PASSWD arrangement of the system of FIG. 1.
Figure 3:
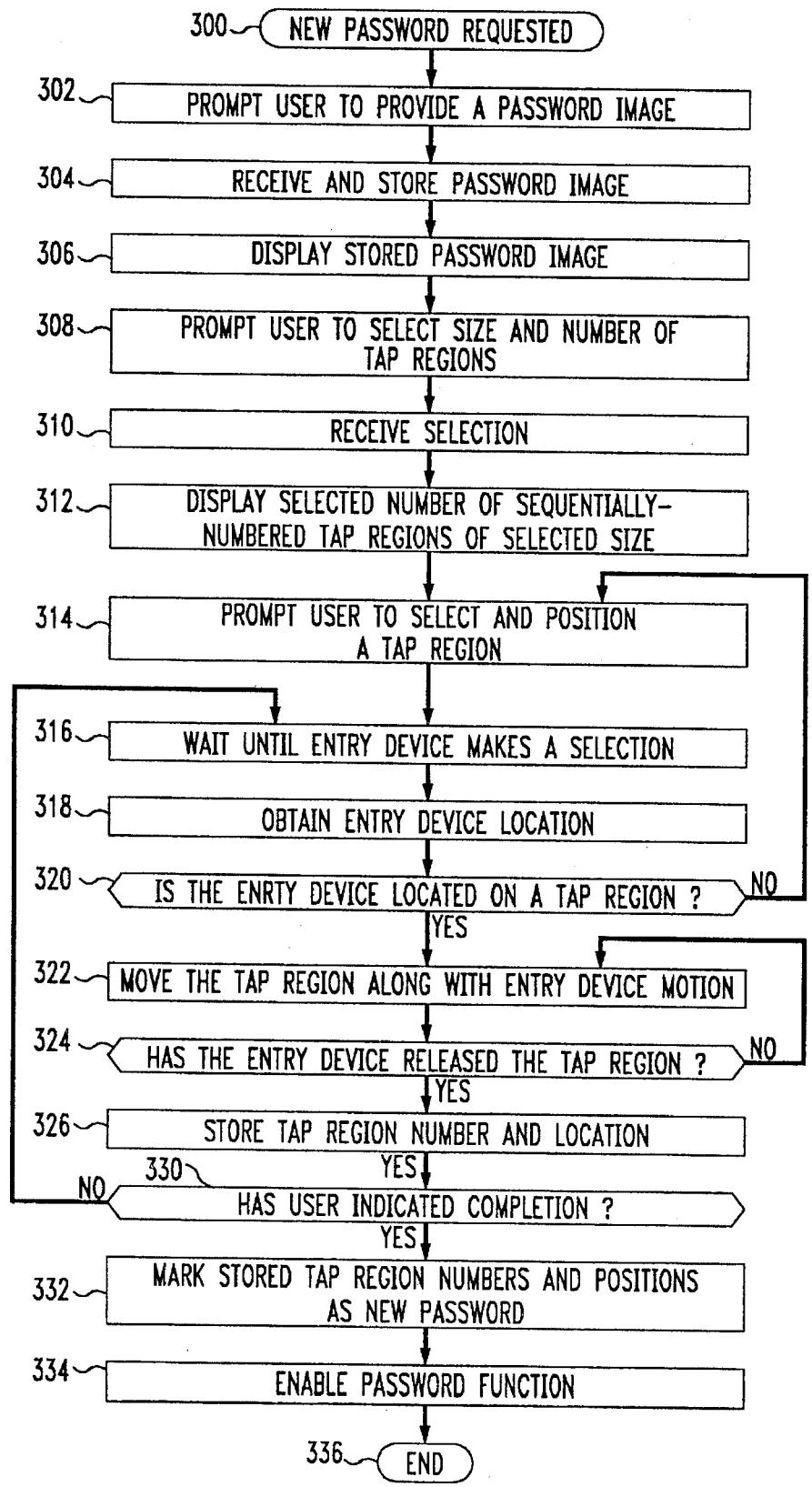
FIG. 3 is a flow diagram of a password change function of the PASSWD arrangement of the system of FIG. 1.

According to the invention, processing system 10 includes a graphical password arrangement PASSWD 16, which in this illustrative example is implemented via a program and data stored in memory 12, and which controls user access to the application capabilities provided by processing system 10. The functionality of PASSWD 16 is represented in flowchart form in FIGS. 2 and 3.

Processing system 10 is initially provided to the user with the password function disabled. Upon power-up of system 10, execution of PASSWD 16 is invoked, at step 200 of FIG. 2, and PASSWD 16 checks whether the password function is enabled, at step 202. If the password function is not enabled, PASSWD 16 grants the user unconditional access to processing system 10 and ceases execution, at step 204.

While using processing system 10, the user may request enablement of the password function or a new password by entering the proper command through an entry device 14. In response, execution of PASSWD 16 is invoked, at step 300 of FIG. 3, and PASSWD 16 prompts the user to provide a password image, at step 302. The user may provide an image in any one or more ways, such as by composing an image on display 15 via one or more entry devices 14, scanning in an existing image via an entry device 14, or selecting one from among a plurality of images that have been loaded and stored in memory 12. PASSWD 16 receives the password image provided by the user and stores it in memory 12, at step 304. It then displays the password image on display 15, at step 306.

Alternatively, the password image may be predefined, and PASSWD 16 skips steps 302 and 304 and proceeds from step 300 directly to step 306.

Following step 306, PASSWD 16 prompts the user to select the size and the number of tap regions that will make up the graphical password, at step 308. Tap regions are positions in the displayed password image. Illustratively, each tap region is a rectangle no larger than 10% of the password image size, and the graphical password consists of at least two tap regions. In response to receiving the user's selection, at step 310, PASSWD 16 displays the selected number of sequentially-numbered tap regions of the selected size along with the password image, at step 312. The tap regions may be displayed in a row along an edge of display 15, or arbitrarily positioned over the password image.

Alternatively, the number and size of tap regions may be predefined, and PASSWD 16 skips steps 308 and 310 and proceeds directly from step 306 to step 312.

Figure 4:
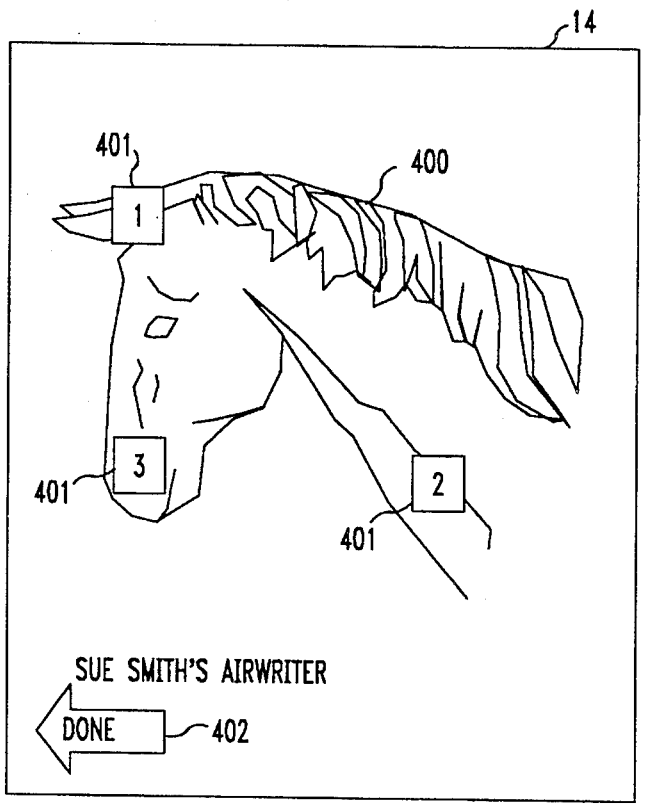
FIG. 4 is an illustrative view of a display of the system of FIG. 1 during execution of the function of FIG. 3.

An illustrative example of the state of display 15 following step 312 is shown in FIG. 4, where numeral 400 designates the password image and numeral 401 designates the tap regions.

Following step 312, PASSWD 16 prompts the user to select a tap region 401 and to position it within password image 400, at step 314. The user performs these functions via one or more entry devices 14, such as by manipulating a cursor via a keyboard, pointing and dragging the cursor with a mouse, or tapping and sliding on display 15 with a light pen or a touch pen. If display 15 is a touch-sensitive screen, the user may perform the functions by tapping and sliding on display 15 with a finger. PASSWD 16 waits until the user makes a location selection on display 15 via an entry device 14, at step 316, and determines the coordinates of the selected location, at step 318. It then determines whether the entry device 14 is located on a tap region 401, that is, whether a tap region 401 has been properly selected, at step 320. If not, PASSWD 16 returns to step 314 to repeat the instructions to the user.

If it is determined at step 320 that a tap region 401 has been properly selected, PASSWD 16 tracks the movement of entry device 14 across display 15 and moves the selected tap region 401 along with the entry device 14, at step 322, while checking for release of the selected tap region 401 by entry device 14, at step 324. Hence, entry device 14 serves to move the tap region 401 relative to the displayed predetermined image 400. When it determines that entry device 14 has released the selected tap region 401, PASSWD 16 stores the sequence number of the selected tap region 401 and the position coordinates of the location within password image 400 where it had been released, at step 326. PASSWD 16 then checks whether the user has indicated completion of password selection, at step 330. Illustratively, in the example of FIG. 3, the user may indicate completion of password selection by selecting a displayed "done" indicator 402 via entry device 14. If the user has not indicated completion, PASSWD 16 returns to step 316 to await re-selection of a tap region 401. If the user has indicated completion, PASSWD 16 marks the stored tap region sequence numbers and position coordinates in memory 12 as the new password, at step 332, enables the password function, at step 334, and then ends its execution, at step 336.

Alternatively, step 334 may be performed not by PASSWD 16 but manually by a user, via interaction with a separate control function of processing system 10.

Figure 5:
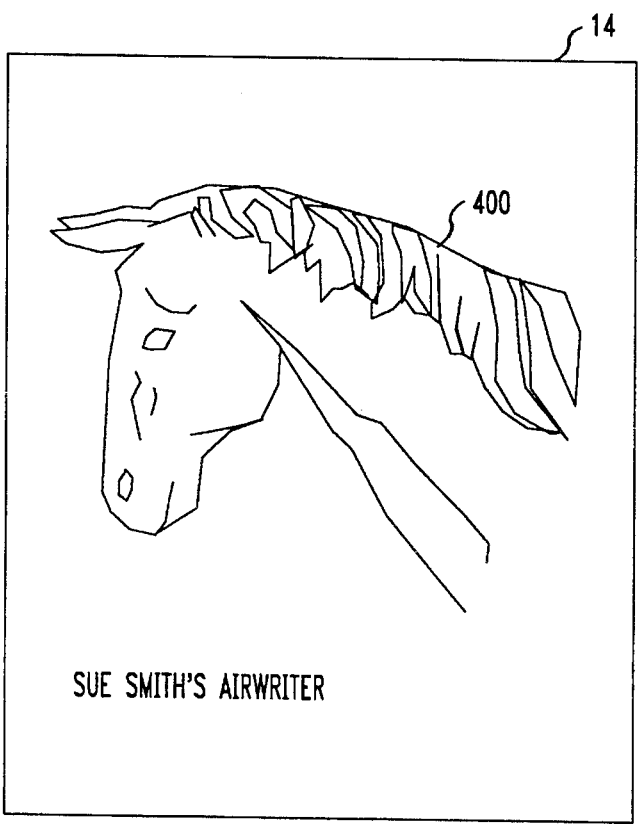
FIG. 5 is an illustrative view of the display of the system of FIG. 1 during execution of the function of FIG. 2.

Returning to FIG. 2, the next time that processing system 10 is powered up, execution of PASSWD 16 is again invoked at step 200, and this time PASSWD 16 determines at step 202 that the password function is enabled. In response, PASSWD 16 retrieves and displays on display 15 the stored password image 400 without also displaying tap regions 40 1, at step 206. An illustrative example of the state of display 15 following step 206 and corresponding to FIG. 4 is shown in FIG. 5. PASSWD 16 also retrieves the total number of tap regions 401 that make up the password, at step 208. PASSWD 16 then waits until the user makes a location selection on display 15 with entry device 14, at step 210, and it obtains and stores the coordinates of the selected location, at step 2 12. Hence, entry device 14 serves to identify, under the user's control, the location selected by the user. Following a selection, PASSWD 16 checks whether the number of selected locations equals the number of tap regions 401 that make up the password, at step 214. If not, PASSWD 16 returns to step 210 to await another sequential selection; if so, PASSWD 16 proceeds to compare the coordinates of each sequentially-selected location against the coordinates of the positions of the corresponding sequentially-numbered tap region 401 within the password image 400 to determine if the selected location lies within the corresponding tap region 401, at steps 216–220. If it is determined at step 218 that the sequence of selected locations sequentially corresponds to the sequence of tap regions, entry of the password has been successful, and PASSWD 16 grants the user access to processing system 10 and ends its execution, at step 226.

If each selected location does not lie within the corresponding tap region 401 in password image 400, entry of the password has failed, and PASSWD 16 checks whether a maximum allowed number of tries at entering the password has been exhausted, at step 222. Illustratively, three tries are allowed. If the maximum number of tries has not been exhausted, PASSWD 16 indicates failure to the user and prompts the user to try again, at step 224. PASSWD 16 then returns to step 210 to await the user's set of selections. But if it is determined at step 222 that the maximum number of tries has been exhausted, PASSWD 16 denies the user access to processing system 10, illustratively by turning power off in processing system 10, and ends its execution, at step 228.

Of course, various changes and modifications to the illustrative embodiment described above will be apparent to those skilled in the art. For example, a password may comprise a plurality of different images, with each image containing one (or more) of the tap regions that make up the password. Thus, a different image would be displayed after each tap (i.e., 3 images, one tap/image). Or, the password may additionally require that particular tap regions be tapped at particular times. For example, the graphical image could be a moving image, such as a short cartoon, requiring the user to click and tap at right locations at the right time. Also, the password image could be a blank screen (i.e., no image), requiring the user to just remember the location of the tap regions by "dead reckoning" (presumably using extra-large tap regions). Such changes and modifications can be made without departing from the spirit and the scope of the invention and without diminishing its attendant advantages. It is therefore intended that such changes and modifications be covered by the following claims.

I claim:

1. A graphical password arrangement comprising:

a display;

first means, responsive to an initial request of a user, for displaying on the display one or more position indicators along with an image;

second means, for moving the displayed position indicators on the display, relative to the displayed image, under control of the user;

third means, cooperative with the second means, for determining the user's positioning of the displayed position indicators in the displayed image;

a memory;

fourth means, responsive to the determined positioning of the position indicators in the displayed image, for storing positions of the position indicators in the displayed image in the memory as a password;

fifth means, responsive to a subsequent request of the user, for displaying on the display the image without the one or more position indicators;

sixth means, responsive to the user's selection of one or more locations in the displayed image without the one or more position indicators, for determining positions of the selected locations in the displayed image;

seventh means, for determining whether the positions of the selected locations correspond to the positions that are stored in the memory as the password; and eighth means, responsive to a determination of a lack of correspondence between the positions of the selected locations and the positions that are stored in the memory as the password, for denying the user access to a resource protected by the password.

2. The arrangement of claim 1 wherein:

the eighth means include means responsive to a determination of correspondence between the positions of the selected locations and the positions that are stored in the memory as the password, for granting the user access to the resource.

3. The arrangement of claim 1 wherein:

the sixth means include a device for identifying, under user control, locations selected by the user in the displayed image.

4. The arrangement of claim 1 wherein:

the positions that are stored in the memory as the password have a predetermined size and a predetermined shape; and the seventh means include means for determining whether the locations selected by the user lie in the displayed image within the positions that are stored in the memory as the password.

5. The arrangement of claim 1 further comprising:

means responsive to a request of the user, for storing an image designated by the user as the image for displaying on the display.

6. The arrangement of claim 1 wherein:

the fourth means store spatial definitions of the positions of the position indicators in the displayed image in the memory as the password, at least some of which positions in the image are devoid of alphanumeric labels;

the sixth means determine spatial definitions of the locations selected by the user in the displayed image;

the seventh means determine whether the spatial definitions of the locations selected by the user correspond to the spatial definitions that are stored in the memory as the password; and the eighth means respond to a determination of a lack of correspondence between the spatial definitions of the locations selected by the user and the spatial definitions that are stored in the memory as the password, by denying the user access to the resource protected by the password.

7. The arrangement of claim 1 wherein:

the first means display on the display a plurality of the position indicators along with the predetermined image;

the third means determine a sequence of the user's positioning of the displayed position indicators in the displayed predetermined image;

the fourth means store the sequence of the positions of the position indicators in the displayed image in the memory as the password;

the sixth means are responsive to the user's sequential selection of a plurality of locations in the displayed predetermined image without the one or more position indicators, for determining the sequence of the positions of the selected locations in the displayed image;

the seventh means determine whether the sequence of the positions of the selected locations corresponds to the sequence of the positions that are stored in the memory as the password; and the eighth means respond to a determination of a lack of correspondence between the sequence of the positions of the selected locations and the sequence of the positions that are stored in the memory as the password, by denying the user access to the resource protected by the password.

8. A graphical password arrangement comprising:

a display;

first means, responsive to an initial request of a user, for displaying on the display an image and additionally displaying on the display a plurality of tap regions, the tap regions having a size and a shape and a sequence;

second means, for moving the displayed tap regions on the display in the displayed image, under control of the user;

third means, cooperative with the second means, for determining the user's positioning of the displayed tap regions in the displayed image;

a memory;

fourth means, responsive to the determined positioning of the displayed tap regions in the displayed image, for storing positions of the sequence of the displayed tap regions in the displayed image in the memory as a password;

fifth means, responsive to a subsequent request of the user, for displaying on the display the image without additionally displaying the tap regions;

sixth means, for selecting locations in the displayed image that is displayed on the display without additionally displaying the tap regions, under control of the user;

seventh means, cooperative with the sixth means, for determining positions of a plurality of the locations selected under control of the user in a sequence;

eighth means, for determining from the positions of the sequence of the selected locations and the positions of the sequence of the tap regions stored in the memory as the password, whether the selected locations lie within the tap regions and whether the sequence of the selected locations corresponds to the sequence of the tap regions; and ninth means, responsive to a determination either that the selected locations lie outside of the tap regions or that the sequence of the selected locations differs from the sequence of the tap regions, for denying the user access to a resource protected by the password, and responsive to a determination that the selected locations lie within the tap regions and the sequence of the selected locations corresponds to the sequence of the tap regions, for granting the user access to the resource.

9. A method of effecting a graphical password, comprising the steps of:

in response to an initial request of a user, displaying to the user one or more position indicators along with an image;

moving the displayed position indicators relative to the displayed image, under control of the user;

in response to the moving, determining the user's positioning of the displayed position indicators in the displayed image;

in response to the determined positioning, storing positions of the position indicators in the displayed message as a password;

in response to a subsequent request of the user, displaying to the user the image without the one or more position indicators;

in response to the user's selection of one or more locations in the displayed image without the one or more position indicators, determining positions of the selected locations in the displayed image;

determining whether the positions of the selected locations correspond to the positions that are stored as the password; and in response to determining a lack of correspondence between the positions of the selected locations and the positions that are stored as the password, denying the user access to a resource protected by the password.

10. A method of effecting a graphical password, comprising the steps of:

in response to an initial request of a user, displaying on a display an image and additionally displaying on the display a plurality of tap regions, the tap regions having a size and a shape and a sequence;

moving the displayed tap regions on the display in the displayed image, under control of the user;

in response to the moving, determining the user's positioning of the displayed tap regions in the displayed image;

in response to the determined positioning, storing positions of the sequence of the displayed tap regions in the displayed image as a password;

in response to a subsequent request of the user, displaying on the display the image without additionally displaying the tap regions;

selecting locations in the displayed image that is displayed on the display without additionally displaying the tap regions, under control of the user;

in response to the selecting, determining positions of a plurality of the locations selected under control of the user in a sequence;

determining, from the positions of the sequence of the selected locations and the positions of the sequence of the tap regions stored as the password, whether the selected locations lie within the tap regions and whether the sequence of the selected locations corresponds to the sequence of the tap regions;

in response to determining either that the selected locations lie outside of the tap regions or that the sequence of the selected locations differs from the sequence of the tap regions, denying the user access to a resource protected by the password; and in response to determining that the selected locations lie within the tap regions and the sequence of the selected locations corresponds to the sequence of the tap regions, granting the user access to the resource.

* * * * *